United States Patent
Daman et al.

(10) Patent No.: US 9,533,653 B2
(45) Date of Patent: Jan. 3, 2017

(54) SYSTEMS AND METHODS FOR DELEGATING CONTROL OF VEHICLE FEATURES TO A WEARABLE ELECTRONIC DEVICE

(71) Applicants: DENSO International America, Inc., Southfield, MI (US); DENSO CORPORATION, Kariya-shi, Aichi-ken (JP)

(72) Inventors: Laith Daman, Novi, MI (US); Kyle Golsch, Pontiac, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/725,746

(22) Filed: May 29, 2015

(65) Prior Publication Data

US 2016/0347280 A1 Dec. 1, 2016

(51) Int. Cl.
*B60R 25/01* (2013.01)
*G08C 17/02* (2006.01)
*G07C 9/00* (2006.01)
*H04W 4/00* (2009.01)

(52) U.S. Cl.
CPC .......... *B60R 25/01* (2013.01); *G07C 9/00658* (2013.01); *G08C 17/02* (2013.01); *H04W 4/005* (2013.01); *H04W 4/008* (2013.01); *G08C 2201/92* (2013.01); *G08C 2201/93* (2013.01)

(58) Field of Classification Search
CPC ........ B60R 25/01; G08G 17/02; H04W 4/005; H04W 4/008; G07C 9/00658; G08C 2201/93; G08C 2201/92
USPC .......................................................... 701/2
See application file for complete search history.

(56) References Cited

U.S. PATENT DOCUMENTS

| | | | |
|---|---|---|---|
| 1,723,234 A | 8/1929 | Gwynne et al. | |
| 2010/0039215 A1 | 2/2010 | Proefke et al. | |
| 2010/0222940 A1 | 9/2010 | Putsch | |
| 2014/0149742 A1 | 5/2014 | Yau | |
| 2014/0293753 A1 | 10/2014 | Pearson | |
| 2015/0070135 A1 | 3/2015 | Ford | |
| 2015/0120151 A1* | 4/2015 | Akay | B60R 25/24 701/49 |

FOREIGN PATENT DOCUMENTS

| | | |
|---|---|---|
| CN | 204150005 U | 2/2015 |
| DE | 102011083820 A1 | 4/2013 |
| DE | 102013016097 A1 | 4/2015 |

(Continued)

*Primary Examiner* — Anne M Antonucci
(74) *Attorney, Agent, or Firm* — Harness, Dickey & Pierce, P.L.C.

(57) ABSTRACT

A method for delegating control of a vehicle feature to a wearable electronic device. The method includes the following: wireless pairing the wearable electronic device to at least one of a smart device or a vehicle controller onboard a vehicle; delegating control of the vehicle feature to the wearable electronic device using at least one of the smart device or the vehicle controller such that a wearer of the wearable electronic device can control the vehicle feature using the wearable electronic device; and operating the vehicle feature based on commands generated by the user using the wearable electronic device.

16 Claims, 4 Drawing Sheets

(56) References Cited

FOREIGN PATENT DOCUMENTS

| | | |
|---|---|---|
| IN | 3703/DEL/2012-1 | 2/2013 |
| JP | 2013106338 A | 5/2013 |
| WO | WO-2008002096 A1 | 1/2008 |
| WO | WO-2013034556 A1 | 3/2013 |
| WO | WO-2015032979 A1 | 3/2015 |

* cited by examiner

SYSTEMS AND METHODS FOR DELEGATING CONTROL OF VEHICLE FEATURES TO A WEARABLE ELECTRONIC DEVICE

FIELD

The present disclosure relates to systems and methods for delegating control of vehicle features to a wearable electronic device.

BACKGROUND

This section provides background information related to the present disclosure, which is not necessarily prior art.

Most all vehicles have as standard or optional equipment a passive entry/passive start (PEPS) key fob. When the PEPS key fob is detected as being outside of the vehicle, the person possessing the PEPS key fob can unlock the doors and trunk without using a physical key, such as by pressing a button on the door handles or trunk. When the PEPS key fob is detected as being inside the vehicle, the vehicle can be started by pressing a "start" button typically located on the dashboard. The functionality of a PEPS key fob can be delegated to a smart phone to eliminate the need to carry both a PEPS key fob and a smart phone. Wearable electronic devices are becoming more prevalent, such as in the form of activity monitors, smart watches, smart glasses, and jewelry. The present teachings provide systems and methods for delegating control of vehicle features to such wearable electronic devices.

SUMMARY

This section provides a general summary of the disclosure, and is not a comprehensive disclosure of its full scope or all of its features.

The present teachings provide for a method for delegating control of a vehicle feature to a wearable electronic device. The method includes the following: wireless pairing the wearable electronic device to at least one of a smart device or a vehicle controller onboard a vehicle; delegating control of the vehicle feature to the wearable electronic device using at least one of the smart device or the vehicle controller such that a wearer of the wearable electronic device can control the vehicle feature using the wearable electronic device; and operating the vehicle feature based on commands generated by the user using the wearable electronic device.

The present teachings also provide for a method for delegating control of a vehicle feature to a wearable electronic device including the following: wireless pairing the wearable electronic device to at least one of a smart device or a vehicle controller onboard a vehicle; delegating control of a passive entry/passive start feature to the wearable electronic device using at least one of the smart device or the vehicle controller; locking the vehicle and maintaining the vehicle in a locked state when at least one of a passive entry/passive start key fob or the smart device are within the vehicle and the wearable electronic device is outside of a predetermined distance from the vehicle; and permitting the vehicle to be unlocked when the wearable electronic device is moved back within the predetermined distance from the vehicle.

The present teachings further provide for a system for delegating control of a vehicle feature to a wearable electronic device. The system includes a controller having a processor and a memory with instructions that when executed by the controller delegate control of the vehicle feature to the wearable electronic device such that a wearer of the wearable electronic device can control the vehicle feature using the wearable electronic device Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
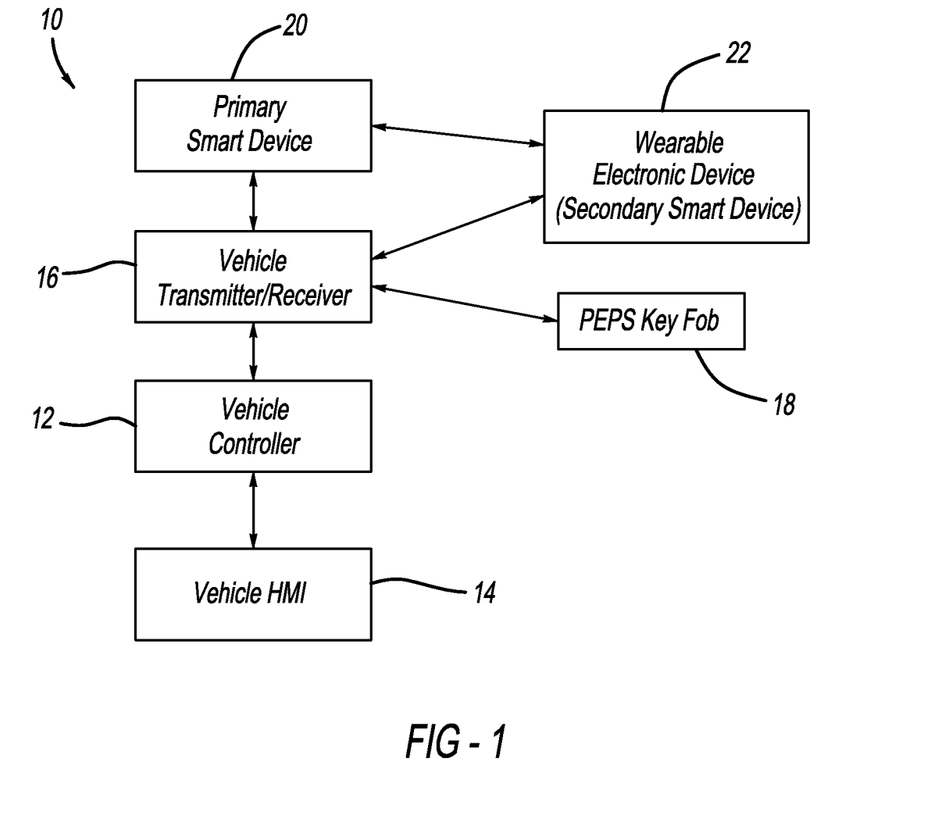
FIG. 1 illustrates a system according to the present teachings for delegating control of vehicle features to a wearable electronic device.

With initial reference to FIG. 1, a system for delegating control of vehicle features and functionality to a wearable electronic device is generally illustrated at reference numeral 10. The system 10 is configured for use with any suitable vehicle, such as a passenger vehicle, a military vehicle, a mass transit vehicle, an aircraft, a recreational vehicle (such as a four wheeler, snowmobile, motorcycle, etc.) or any other suitable vehicle or transport device. Any suitable vehicle feature (including any suitable vehicle functionality) can be delegated to the wearable electronic device 22 using the system 10. For example, the following exemplary features may be delegated: passive entry/passive start (including vehicle lock, vehicle unlock, vehicle on, and vehicle off), climate control, entertainment system control, communication system control, navigation system control, window control, lift gate control, or any other suitable vehicle feature. The system 10 generally includes, for example, a vehicle controller 12, a vehicle human machine interface (HMI) 14, a vehicle transmitter/receiver 16, a passive entry/passive start (PEPS) key fob 18, a primary smart device 20, and a wearable electronic device 22, which can be a secondary smart device. As described herein, vehicle features may be delegated directly to the wearable electronic device 22 from the vehicle controller 12, thus making the primary smart device 20 unnecessary for delegating features to the wearable electronic device 22. Furthermore, the primary smart device 20 may be configured with PEPS functionality, thus making the PEPS key fob 18 unnecessary to unlock, lock, and start the vehicle.

The vehicle controller 12 can be any suitable control device configured to control operation of the vehicle features identified above, as well as any other suitable vehicle features (including any suitable vehicle functionality). The vehicle controller 12 can be a single controller or a plurality of controllers. For example, the vehicle controller 12 can include a Bluetooth low energy controller, an RF controller, a body control module (BCM) controller (configured to control vehicle lock/unlock, engine start, etc.), and/or a vehicle HMI controller. The vehicle controller 12 can be and/or include any suitable processor, CPU, memory, and storage device, as well as any other suitable devices, features, and/or components configured to permit the vehicle controller 12 to control the vehicle features listed above, as well as any other suitable vehicle features. The vehicle controller 12 can include any suitable storage and/or memory device including instructions, which when performed by the vehicle controller 12 delegate the vehicle features to the wearable electronic device 22, such as according to the methods described herein at reference numerals 110 (FIG. 2), 210 (FIGS. 3), and 310 (FIG. 4), for example. The vehicle controller 12 may be or include original equipment, or may may be or include an aftermarket product, such as an after-market stereo for example, which may include a Bluetooth low energy controller and at least a portion of the vehicle HMI 14.

The vehicle HMI 14 can include any suitable device(s) configured to allow a user to input commands to the vehicle controller 12. For example, the vehicle HMI 14 can include a touch screen, joystick, one or more dials, one or more buttons, and/or one or more levers, such as at a dashboard of the vehicle. The vehicle HMI 14 can also be configured to display status information generated by the vehicle controller 12, such as the vehicle features that have been delegated to the wearable electronic device 22, the operational status of the vehicle climate control system, the status of the vehicle communication system, etc.

The vehicle transmitter/receiver 16 can be any suitable transmitter/receiver configured to transmit/receive data between the vehicle controller 12 and one or more of the PEPS key fob 18, the primary smart device 20, and the wearable electronic device 22. For example, the vehicle transmitter/receiver 16 can wirelessly transmit and receive data in any suitable manner, such as through Bluetooth low-energy connectivity, WiFi, and/or NFC.

The PEPS key fob 18 can be any suitable key fob configured with passive entry/passive start capabilities. For example, the PEPS key fob 18 can be any key fob detectable by the vehicle controller 12 when the PEPS key fob 18 is within a predetermined distance from the vehicle. Upon detection of the PEPS key fob 18, the vehicle controller 12 is configured to permit the vehicle to be unlocked without insertion of a physical key. Thus, when a person in possession of the PEPS key fob 18 approaches the vehicle and, for example, presses a button on an exterior of the vehicle, the vehicle will unlock. When the vehicle controller 12 detects the PEPS key fob 18 as being within the vehicle, the controller 12 will permit the vehicle to be started, which with an internal combustion engine vehicle includes starting the engine. When the vehicle controller 12 is unable to detect the PEPS key fob 18 within the predetermined distance from the vehicle, the vehicle controller 12 will maintain the vehicle in a locked state.

The primary smart device 20 can be any suitable smart device, such as a smart phone, tablet computer, laptop computer, or any other device configured to communicate with the vehicle controller 12 by way of the vehicle transmitter/receiver 16, as well as wirelessly communicate with the wearable electronic device 22 in any suitable manner, such as by using Bluetooth low-energy connectivity. The primary smart device 20 can include any suitable controller, including any suitable processor, as well as any suitable memory and storage device configured to store instructions for delegating vehicle features to the wearable electronic device 22, such as according to the methods described herein at reference numerals 110, 210, and 310. For example, the primary smart device can be an Apple iPhone, any suitable device configured to run the Android operating system, or any other suitable portable smart device operating any suitable mobile operating system.

The primary smart device 20 can be configured with PEPS functionality such that the primary smart device 20 operates in the same manner as the PEPS key fob 18, thus eliminating the need for one to carry the PEPS key fob 18 in addition to the primary smart device 20. The primary smart device 20 is further configured to delegate vehicle features under control of the vehicle controller 12 to the wearable electronic device 22 in any suitable manner. For example, an operator of the primary smart device can select, using the operating system thereof, at least the features identified above for delegation to the wearable electronic device 22. For example, the primary smart device 20 can include an application listing the vehicle features available to delegate to the wearable electronic device 22, and a user can select one or more of the vehicle features for delegation to the wearable electronic device 22 so that the wearable electronic device 22 can be used to operate the delegated vehicle features.

The wearable electronic device 22 can be any suitable wearable electronic device, such as a smart watch, smart glasses, an activity monitor (such as a Fit Bit for example) or a wearable electronic device incorporated into jewelry, such as an earring or necklace. The wearable electronic device 22 can thus be a secondary smart device or merely a monitor that does not possess significant data processing capabilities. The wearable electronic device 22 can include any suitable transmitter, and optionally a receiver, configured for communication with the primary smart device 20 and/or the vehicle controller 12 by way of the vehicle transmitter/receiver 16. For example, the wearable electronic device 22 can include a Bluetooth low-energy transmitter/receiver, WiFi communication, and/or NFC communication.

The wearable electronic device 22 can include one or more input devices, such as buttons and/or a touch screen, configured to accept inputs from a user thereof for operating features delegated to the wearable electronic device 22. Furthermore, the wearable electronic device 22 can include an accelerometer or any other suitable motion detector configured to detect motions of the wearer of the wearable electronic device corresponding to inputs for operating vehicle features delegated to the wearable electronic device 22. For example, if climate control functionality is delegated to the wearable electronic device 22, rotation of the user's hand in a clockwise direction may represent a command to increase the temperature of the vehicle passenger cabin. Conversely, rotation of the user's hand in a counterclockwise direction may represent a command to decrease the temperature. With respect to entertainment system functionality delegated to the wearable electronic device 22, rotation of the wearer's hand in a clockwise direction may be a command to change the radio to a higher channel setting, and rotation of the user's hand in a counterclockwise direction may be a command to change the channel to a lower channel setting. Any other suitable hand gestures for operating any of the delegated vehicle features may be used as well, such as palm down and clockwise to palm up, and then counterclockwise to palm down, which can represent any suitable command. Another suitable hand gesture includes hand shaking.

Figure 2:
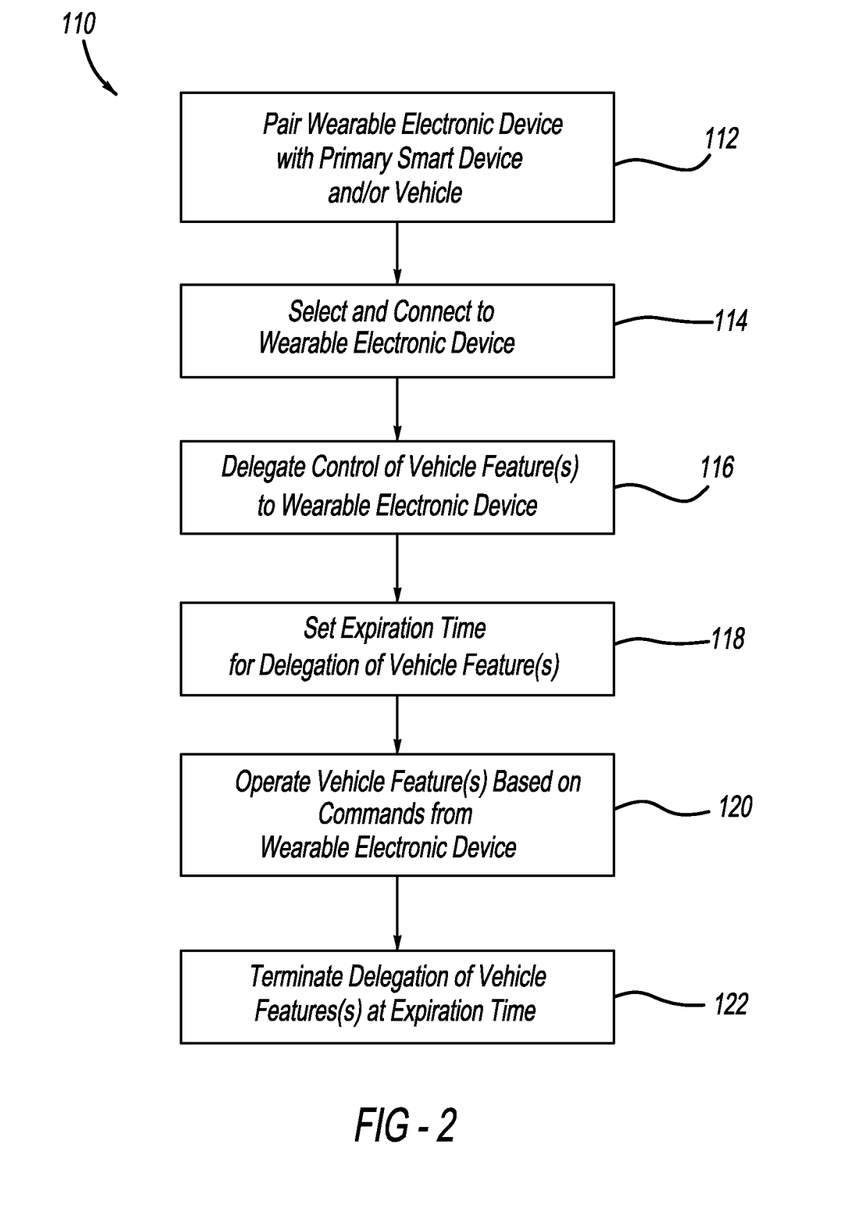
FIG. 2 illustrates a method according to the present teachings for delegating control of vehicle features to a wearable electronic device.

With continued reference to FIG. 1, and additional reference to FIG. 2, an exemplary method for delegating control of one or more vehicle features to the wearable electronic device 22 is generally illustrated at reference numeral 110. With initial reference to block 112, the wearable electronic device 22 is paired with the primary smart device 20 and/or the vehicle controller 12. The wearable electronic device 22 can be paired in any suitable manner, such as by transmitting any suitable device ID of the wearable electronic device 22, such as the MAC address for example, to the primary smart device 20 and/or the vehicle controller 12 and storage of the device ID at the primary smart device 20 and/or the vehicle controller 12 for future recognition of the wearable electronic device 22 by, and future connection to, the primary smart device 20 and/or the vehicle controller 12.

At block 114, the wearable electronic device 22 is recognized and selected by the primary smart device 20 and/or the vehicle controller 12 either automatically or by a user, and wirelessly connected thereto in any suitable manner, such as with a Bluetooth low-energy connection. At block 116, a user can select one or more vehicle features and delegate the one or more vehicle features to the wearable electronic device 22 using the primary smart device 20, the vehicle controller 12 by way of the vehicle HMI 14, and/or the wearable electronic device 22. For example, the primary smart device 20 and/or the vehicle controller 12 can execute any suitable application configured to perform the method 110, as well as the methods 210 and 310 described herein. Thus using the primary smart device 20 and/or the vehicle controller 12 (by way of the vehicle HMI 14) the user can select and delegate one or more of the vehicle features to the wearable electronic device 22 in any suitable manner. For example, the delegation may be performed such that the wearable electronic device 22 does not know which vehicle feature has been delegated to it, or in some applications whether it has been delegated any feature at all. This is because the delegated feature is associated with the device ID at the vehicle controller 12 and/or at the primary smart device 20, thus eliminating the need to transmit detailed data regarding the delegated feature to the wearable electronic device 22. This will advantageously reduce the need for storage and processing power at the wearable electronic device 22, thus allowing the wearable electronic device 22 to be a simple activity monitor, for example, or any other wearable device with limited storage and processing capabilities.

Furthermore, using the primary smart device 20 or the vehicle controller 12, the features can be readily de-delegated from the wearable electronic device 22 by disassociating the device ID of the wearable electronic device with a previously delegated feature. Therefore, if the wearable electronic device 22 is lost or stolen, or the owner of the vehicle decides he or she no longer wants the person in possession of the wearable electronic device 22 to have access to the delegated feature, for example, the delegated feature can be easily de-delegated even if access to the wearable electronic device 22 is not available. Because delegation of features is based on recognition of the wearable electronic device's device ID, no sensitive information is transmitted to the wearable electronic device 22, such as electronic key information that can be used to open the vehicle and which once transferred to the wearable electronic device 22 cannot be revoked without access to the wearable electronic device 22. Using the primary smart device 20 or the vehicle HMI 14, at block 118 the user can set an expiration time for the delegated feature. Thus upon expiration of the set time, the wearable electronic device 22 will no longer be operable to control the delegated vehicle feature.

At block 120, the vehicle features delegated to the wearable electronic device 22 can be operated in any suitable manner using the wearable electronic device 22. If the wearable electronic device 22 is worn on the user's arm, for example, the user can use hand gestures. For example, if the vehicle feature delegated is control of the vehicle climate control system, after making any suitable initiation gesture, such as holding his or hand in a raised position for a set period of time, the user can raise the temperature by rotating his or her hand in a clockwise direction. The user can decrease the temperature by rotating his or her hand in a counterclockwise direction. If the delegated feature is operation of the vehicle communication system, the user may answer an incoming call by raising his or her hand to his or her ear. When the delegated feature is the ability to the lock and/or unlock the vehicle doors, the user may lock the doors by raising or rotating his or her hand clockwise, and unlock the doors by lowering or rotating his or her hand counterclockwise. When the delegated feature is starting the vehicle, the user may start the vehicle by moving his or her hand in a circular motion. The delegated vehicle feature can also be operated by pressing one or more buttons or a touch panel of the wearable electronic device.

Furthermore, the mere presence of the wearable electronic device 22 within a predetermined distance from the vehicle may constitute the command, which in such a configuration would constitute a passive command, if the wearable electronic device 22 was previously paired. In other words, detection of a previously paired wearable electronic device 22 within the predetermined range of the vehicle by the vehicle controller 12 would result in the vehicle controller 12 performing a function based on the delegated feature. For example, if the delegated feature was vehicle lock/unlock, the passive command would be to unlock the doors when the wearable electronic device 22 is within the predetermined distance and lock the doors when the wearable electronic device 22 is outside of the predetermined distance. With reference to block 122, if an expiration time for control of the delegated feature has been set, the user's ability to control the feature using the wearable electronic device 22 will be terminated upon expiration of the previously set time.

Figure 3:
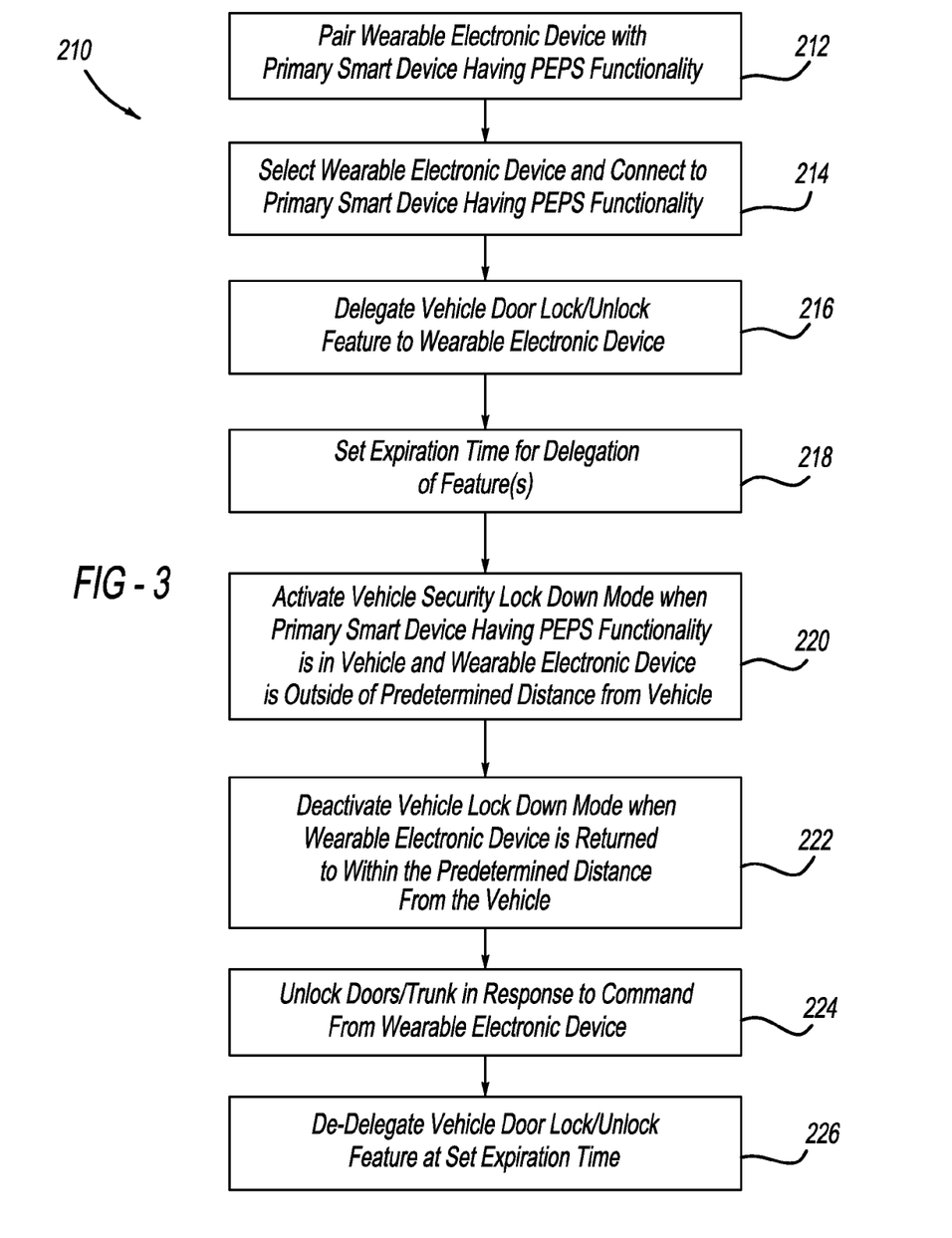
FIG. 3 illustrates another method according to the present teachings for delegating control of vehicle features to a wearable electronic device.

With continued reference to FIG. 1 and additional reference to FIG. 3, an additional method according to the present teachings for delegating control of vehicle features to the wearable electronic device 22 is generally illustrated at reference numeral 210. With reference to block 212, the primary smart device 20 having PEPS functionality is paired with the wearable electronic device 22 so that the wearable electronic device 22 is recognized by the primary smart device 20, such as by storing a device ID of the wearable electronic device 22 at the primary smart device 20 for connection therebetween. At block 214, the wearable electronic device 22 is selected using the primary smart device 20, and the wearable electronic device 22 and the primary smart device 20 are wirelessly connected in any suitable manner, such as with a Bluetooth low-energy connection.

At block 216, the primary smart device 20 is used to delegate control of the vehicle door lock/unlock feature to the wearable electronic device 22. This feature can be delegated in any suitable manner, such as by using an application running on the primary smart device 20 based on instructions stored on the primary smart device 20. At block 218, the user can use the primary smart device 20 to set an expiration time for operation of the delegated feature using the wearable electronic device 22.

At block 220, when the primary smart device 20 is identified as being within the vehicle and the wearable electronic device 22 is identified as being outside of a predetermined distance from the vehicle by the vehicle controller 12, the vehicle controller 12 will deactivate and/or ignore the PEPS functionality of the primary smart device 20, which would typically inhibit locking the vehicle when the PEPS enabled primary smart device 20 is within the vehicle, and activate a security lockdown mode of the vehicle in which the vehicle is locked and cannot be opened as long as the wearable electronic device 22 is outside of the predetermined distance from the vehicle. Thus advantageously, a user can lock his or her primary smart device 20 within the vehicle while performing an activity away from the vehicle, such as riding a bicycle, and not be encumbered by having to carry his or her primary smart device 20.

With reference to block 222, when the vehicle controller 12 determines that the wearable electronic device 22 has returned to within the predetermined distance from the vehicle, such as when the user returns to the vehicle after his or her bike ride, and the vehicle controller 12 identifies the device ID of the wearable electronic device 22 as a previously paired device, the vehicle controller 12 will deactivate the vehicle lockdown mode. As a result, at block 224 the user will be able to unlock the vehicle doors by, for example, pressing a button on the vehicle doors, or inputting an unlock command using the wearable electronic device 22 in any suitable manner, such as by pressing a button on the wearable electronic device 22 or using any suitable hand gesture. At block 226, if an expiration time for delegation of the vehicle feature to the wearable electronic device 22 has been set, the primary smart device 20 and/or the vehicle controller 12 will de-delegate the vehicle door lock/unlock feature at the set expiration time.

Figure 4:
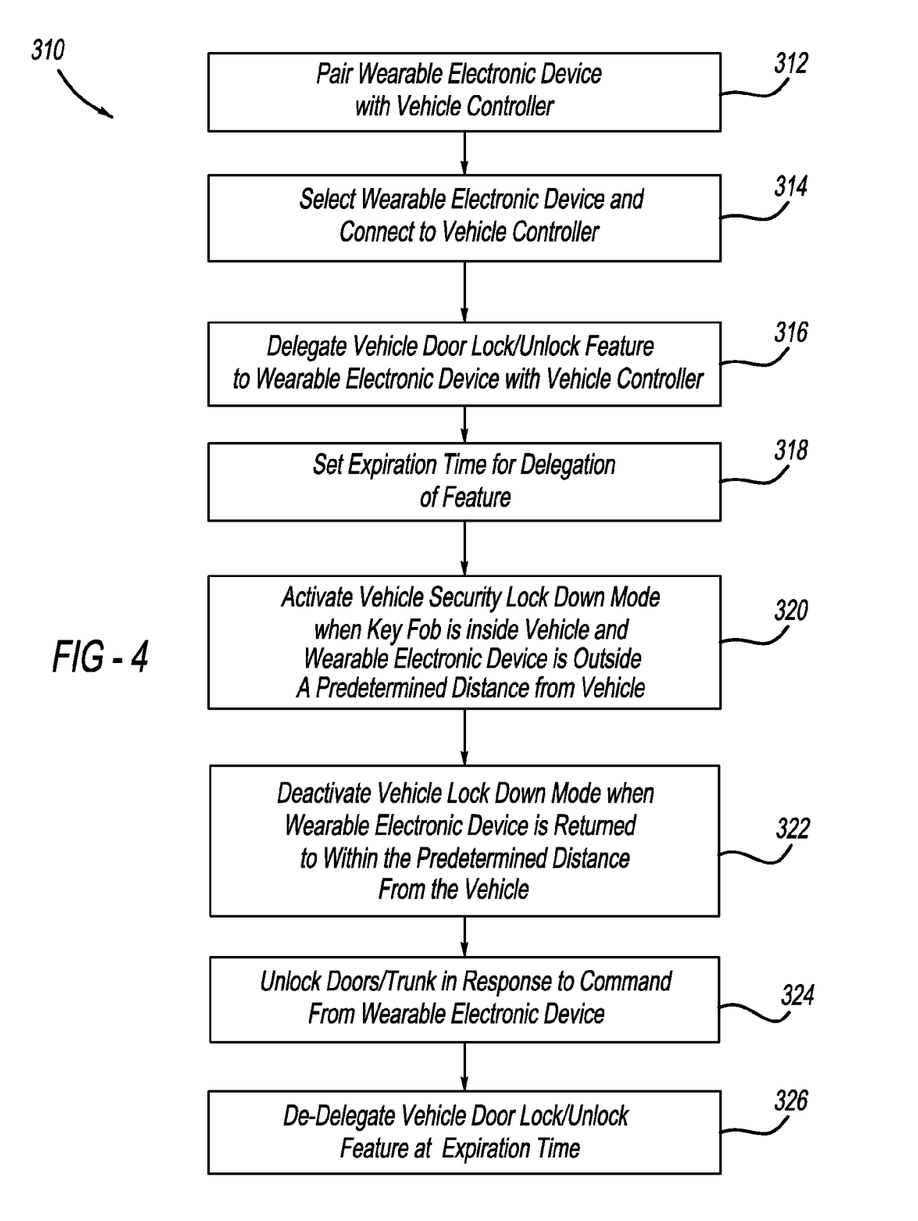
FIG. 4 illustrates an additional method according to the present teachings for delegating control of vehicle features to a wearable electronic device.

With reference to FIG. 4, an additional method for delegating control of one or more vehicle features to the wearable electronic device 22 is generally illustrated at reference numeral 310. With initial reference to block 312, the wearable electronic device 22 is paired with the vehicle controller 12, such that the vehicle controller 12 stores a device ID of the wearable electronic device 22 for future recognition of the wearable electronic device 22. At block 314, the wearable electronic device 22 can be selected for connection of the vehicle controller 12 using the vehicle HMI 14. The wearable electronic device 22 can be connected to the vehicle controller 12 in any suitable manner, such as by a Bluetooth low-energy connection.

With reference to block 316, using the vehicle HMI 14 a user can instruct the vehicle controller 12 to delegate the vehicle door lock/unlock feature to the wearable electronic device 22. At block 318, the user can use the vehicle HMI 14 to input an expiration time to the vehicle controller 12 for terminating delegation of the vehicle door lock/unlock feature. At block 320, the vehicle controller 12 deactivates and/or ignores the PEPS functionality of the PEPS key fob 18, which would typically inhibit locking the vehicle when the PEPS key fob 18 is within the vehicle, activates the vehicle security lockdown mode when the vehicle controller 12 detects that the PEPS key fob 18 is inside of the vehicle, and the wearable electronic device 22 is outside of a predetermined distance from the vehicle.

With reference to block 322, the vehicle controller 12 deactivates the vehicle lockdown mode when it detects that the wearable electronic device 22 is returned to within the predetermined distance from the vehicle, such as by recognizing the device ID of the wearable electronic device 22. At block 324, the vehicle controller 12 unlocks the vehicle doors, lift gate, and/or trunk in response to a user command input to the wearable electronic device 22 in any suitable manner, such as by using any suitable hand gesture or pressing a button or display screen on the wearable electronic device 22. At block 326, if an expiration time was previously set, the vehicle controller will de-delegate operation of the vehicle door lock/unlock feature from the wearable electronic device 22 at the expiration time.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for delegating control of a vehicle feature to a wearable electronic device comprising:
   wireless pairing the wearable electronic device to at least one of a smart device or a vehicle controller onboard a vehicle;
   delegating control of the vehicle feature to the wearable electronic device using at least one of the smart device or the vehicle controller such that a wearer of the wearable electronic device can control the vehicle feature using the wearable electronic device; and
   operating the vehicle feature based on commands generated by the user using the wearable electronic device;
   wherein delegating control of the vehicle feature includes delegating vehicle passive entry/passive start functionality to the wearable electronic device, the method further comprising:
   locking the vehicle when the smart device is within the vehicle and the wearable electronic device is located outside of a predetermined distance away from the vehicle;
   locking the vehicle when a passive entry/passive start key fob is within the vehicle and the wearable electronic device is located outside of the predetermined distance away from the vehicle;
   maintaining the vehicle in a locked state while the smart device is within the vehicle and the wearable electronic device is located outside of the predetermined distance away from the vehicle;
   maintaining the vehicle in the locked state while the passive entry/passive start key fob is within the vehicle and the wearable electronic device is located outside of the predetermined distance away from the vehicle;
   permitting the vehicle to be unlocked when the smart device is within the vehicle and the wearable electronic device is moved from outside of the predetermined distance to within the predetermined distance; and
   permitting the vehicle to be unlocked when the passive entry/passive start key fob is within the vehicle and the wearable electronic device is moved from outside of the predetermined distance away from the vehicle to within the predetermined distance.

2. The method of claim 1, wherein the smart device is a smart phone.

3. The method of claim 1, wherein the wearable electronic device is a smart watch, an activity monitor, smart glasses, or included with jewelry.

4. The method of claim 1, wherein the vehicle feature includes at least one of the following: locking and unlocking the vehicle; turning the vehicle on and off; operating an entertainment system of the vehicle; operating a communication system of the vehicle; operating a climate control system of the vehicle; or operating a navigation system of the vehicle.

5. The method of claim 1, further comprising setting a start time and an end time of the delegated control of the vehicle feature, and terminating the delegated control of the vehicle feature at the end time.

6. The method of claim 1, further comprising delegating control of the vehicle feature to the wearable electronic device using Bluetooth communication between the smart device and the wearable electronic device.

7. The method of claim 1, further comprising delegating control of the vehicle feature to the wearable electronic device using Bluetooth communication between a transmitter of the vehicle and the wearable electronic device.

8. The method of claim 1, wherein the vehicle feature is operated based on gesture commands generated by the user using the wearable device.

9. A method for delegating control of a vehicle feature to a wearable electronic device comprising:
   wireless pairing the wearable electronic device to at least one of a smart device or a vehicle controller onboard a vehicle;
   delegating control of a passive entry/passive start feature to the wearable electronic device using at least one of the smart device or the vehicle controller;
   locking the vehicle and maintaining the vehicle in a locked state when at least one of a passive entry/passive start key fob or the smart device are within the vehicle and the wearable electronic device is outside of a predetermined distance from the vehicle; and
   permitting the vehicle to be unlocked when the wearable electronic device is moved back within the predetermined distance from the vehicle.

10. The method of claim 9, further comprising unlocking the vehicle in response to a command received from the wearable electronic device when the wearable electronic device is moved back within the predetermined distance from the vehicle.

11. The method of claim 9, further comprising de-delegating control of the passive entry/passive start feature after expiration of a predetermined period of time.

12. A system for delegating control of a vehicle feature to a wearable electronic device comprising:
   a controller including a processor and a storage device having instructions that when executed delegate control of the vehicle feature to the wearable electronic device such that a wearer of the wearable electronic device can control the vehicle feature using the wearable electronic device;
   wherein the controller is configured to maintain the vehicle in a locked state when the wearable electronic device is outside of a predetermined distance from the vehicle and at least one of a passive entry/passive start key fob and a smart device are within the vehicle.

13. The system of claim 12, wherein the controller is a smart phone controller.

14. The system of claim 12, wherein the controller is an onboard vehicle controller.

15. The system of claim 12, wherein the vehicle feature includes at least one of the following: locking and unlocking the vehicle; turning the vehicle on and off; operating an entertainment system of the vehicle; operating a communication system of the vehicle; operating a climate control system of the vehicle; and operating a navigation system of the vehicle.

16. The system of claim 12, wherein the controller is configured to permit the vehicle to be unlocked when the wearable electronic device is returned to within the predetermined distance from the vehicle and the at least one of the passive entry/passive start key fob and the smart device are within the vehicle.

* * * * *